(12) United States Patent
Peleg et al.

(10) Patent No.: US 8,249,394 B2
(45) Date of Patent: Aug. 21, 2012

(54) METHOD AND SYSTEM FOR SHIFT-MAP IMAGE EDITING

(76) Inventors: Shmuel Peleg, Mevaseret Zion (IL);
Yael Pritch, Ramat Motza (IL); Eitam Kav Venaki, Arad (IL)

( * ) Notice: Subject to any disclaimer, the term of this patent is extended or adjusted under 35 U.S.C. 154(b) by 379 days.

(21) Appl. No.: 12/723,248

(22) Filed: Mar. 12, 2010

(65) Prior Publication Data

US 2010/0232729 A1    Sep. 16, 2010

Related U.S. Application Data

(60) Provisional application No. 61/159,640, filed on Mar. 12, 2009, provisional application No. 61/297,900, filed on Jan. 25, 2010.

(51) Int. Cl.
*G06K 9/32* (2006.01)
*G06K 9/36* (2006.01)
*G09G 5/00* (2006.01)

(52) U.S. Cl. ............ 382/295; 382/276; 345/672

(58) Field of Classification Search .......... 382/263–264, 382/276, 293, 298, 305, 312, 284; 358/1.2, 358/3.27; 345/660, 611, 629, 672
See application file for complete search history.

(56) References Cited

U.S. PATENT DOCUMENTS

| | | | | |
|---|---|---|---|---|
| 5,233,168 A | * | 8/1993 | Kulik | 235/456 |
| 5,544,267 A | * | 8/1996 | Mahoney et al. | 382/317 |
| 5,774,599 A | * | 6/1998 | Muka et al. | 382/254 |
| 6,898,331 B2 | * | 5/2005 | Tiana | 382/274 |
| 7,477,800 B2 | | 1/2009 | Avidan et al. | |
| 7,529,429 B2 | | 5/2009 | Rother et al. | |

OTHER PUBLICATIONS

Agarwala et al., "Interactive Digital Photomontage," ACM Trans. Graph., 2004, 23(3)294-302.
Boykov et al., "Fast approximate energy minimization via graph cuts," IEEE Transactions on Pattern Analysis and Machine Intelligence, 2001. 23(11).
Cho et al., "The Patch Transform and Its Applications to Image Editing," 2008 IEEE Computer Society Conference on Computer Vision & Pattern Recognition (CVPR'08), 2008.
Perez et al.. "Object Removal by Exemplar-Based Inpainting," 2003 Computer Society Conference on Computer Vision & Pattern Recognition (CVPR'03), 2003.
Hays et al., "Scene Completion Using Millions of Photographs," ACM Transactions on Graphics 2007, vol. 26, Issue 3, Article 4.
Kolmogorov et al., "What Energy Functions can be Minimized via Graph Cuts?" 2002 European Conference on Computer Vision (ECCV'02), 2002, pp. 65-81.

(Continued)

*Primary Examiner* — Kanjibhai Patel

(57) ABSTRACT

Natural looking output images are computed from input images based on given user constraints. Pixels in the output images are assigned a shift such that the respective output pixel value is derived from the value of the input pixel whose location is related to that of the output pixel by the shift, at least one shift being non-zero. The shift is determined by an optimization process adapted to minimize a cost function that includes a data term on the shifts of single pixels and a smoothness term on the shifts of pixel pairs. The output image is computed by applying the optimized shift-map between the input and output pixels. The data term can include shift constraints that limit the location in the output images of selected input pixels, and saliency constraints, indicating a preference that selected pixels in the input images will or will not appear in the output image.

9 Claims, 4 Drawing Sheets

OTHER PUBLICATIONS

Komodakis et al., "Image Completion Using Global Optimization," 2006 Computer Society Conference on Computer Vision & Pattern Recognition (CVPR'06), 2006.

Kwatra et al., "Graphcut Textures: Image and Video Synthesis Using Graph Cuts," SIGGRAPH '03, 2003, pp. 277-286.

Lombaert et al., "A Multilevel Banded Graph Cuts Method for Fast Image Segmentation," 2005 IEEE International Conference on Computer Vision (ICCV '05), 2005, vol. 1, pp. 259-265.

Rubinstein et al., "Improved Seam Carving for Video Retargeting," ACM Transactions on Graphics, Aug. 2008, vol. 27, No. 3, Article 16.

Simakov et al., "Summarizing Visual Data Using Bidiredctional Similarity," 2008 Computer Society, Conference on Computer Vision & Pattern Recognition (CVPR'08), 2008.

Sun et al., "Image Completion with Structure Propagation," SIGGRAPH '05, 2005, pp. 861-868.

Wang et al., "Optimized Scale-and-Stretch for image Resizing," ACM Transactions Graphics, 2008, vol. 27, No. 5, Article 118.

Wexler et al., "Space-Time Video Completion," 2004 Computer Society Conference on Computer Vision & Pattern Recognition (CVPR'04) 2004, vol. 1, pp. 120-127.

Wilczkowiak et al., "Hole Filling Through Photomontage," In: Clocksin, FW and Fitzgibbon, AW and Torr, PHS. (eds.) Proceedings of the British Machine Vision Conference 2005, Sep. 2005, pp. 492-501, British Machine Vision Association, Oxford, UK.

Wolf at al., "Non-Homogeneous Content-Driven Video-Retargeting," IEEE International Conference on Computer Vision (ICCV '07), 2007, pp. 1-6.

Freeman et al., "Example-Based Super-Resolution," IEEE Computer Graphics and Applications: 2002, vol. 22, No. 2, pp. 56-65.

Hertzmann et al., "Image Analogies," SIGGRAPH'01, 2001, pp. 327-340.

Glasner et al., "Super-Resolutin from a Single Image," IEEE 12th International Conference on Computer Vision (ICCV), 2009.

Bishop. C.M., "Graphical Models", In Pattern Recognition and Machine Learning; pp. 359-422, 1st Edition, 2006, Springer; New York, NY.

* cited by examiner

METHOD AND SYSTEM FOR SHIFT-MAP IMAGE EDITING

CROSS-REFERENCE TO RELATED APPLICATIONS

This application relates to and claims priority from U.S. Provisional Applications Nos. 61/159,640, filed Mar. 12, 2009, and 61/297,900, filed Jan. 25, 2010, the contents of both are herein incorporated by reference in their entirety.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE DISCLOSURE

1. Field of the Invention

The present general inventive concept relates to computer image processing, and more particularly, to systems and methods for digital image editing.

2. Description of the Related Art

Related art references to the general inventive concept are listed below and their content is incorporated herein by reference. Acknowledgement of the references as related art is not to be inferred as meaning that these are in any way relevant to the patentability of the general inventive concept disclosed herein. Each reference is identified by a number enclosed in square brackets and accordingly, each related art reference will be referred to throughout the specification by numbers enclosed in square brackets.

[1] A. Agarwala, M. Dontcheva, M. Agrawala, S. Drucker, A. Colburn, B. Curless, D. Salesin, and M. Cohen. Interactive digital photomontage. *ACM Trans. Graph.*, 23(3):294-302, 2004.
[2] U.S. Pat. No. 7,477,800-Method for retargeting images, S. Avidan and A. Shamir.
[3] Y. Boykov, O. Veksler, and R. Zabih. Fast approximate energy minimization via graph cuts. *IEEET-PAMI*, 23:2001, 2001.
[4] T. Cho, M. Butman, S. Avidan, and W. Freeman. The patch transform and its applications to image editing. In *CVPR '08*, 2008.
[5] A. Criminisi, P. Prez, and K. Toyama. Object removal by exemplar-based inpainting. In *CVPR '03*, volume 2, pages 721-728, 2003.
[6] J. Hays and A. Efros. Scene completion using millions of photographs. *CACM*, 51(10):87-94, 2008.
[7] V. Kolmogorov and R. Zabih. What energy functions can be minimized via graph cuts? In *ECCV '02*, pages 65-81, 2002.
[8] N. Komodakis. Image completion using global optimization. In *CVPR '06*, pages 442-452, 2006.
[9] V. Kwatra, A. Schodl, I. Essa, G. Turk, and A. Bobick. Graphcut textures: image and video synthesis using graph cuts. In *SIGGRAPH '03*, pages 277-286, 2003.
[10] H. Lombaert, Y. Sun, L. Grady, and C. Xu. A multilevel banded graph cuts method for fast image segmentation. In *ICCV '05*, volume 1, pages 259-265, 2005.
[11] M. Rubinstein, A. Shamir, and S. Avidan. Improved seam carving for video retargeting. *ACM Trans. Graph.*, 27(3):1-9, 2008.
[12] D. Simakov, Y. Caspi, E. Shechtman, and M. Irani. Summarizing visual data using bidirectional similarity. In *CVPR '08*, 2008.
[13] J. Sun, L. Yuan, J. Jia, and H. Shum. Image completion with structure propagation. In *SIGGRAPH '05*, pages 861-868, 2005.
[14] Y. Wang, C. Tai, O. Sorkine, and T. Lee. Optimized scale-and-stretch for image resizing. *ACM Trans. Graph.*, 27(5):1-8, 2008.
[15] Y. Wexler, E. Shechtman, and M. Irani. Space-time video completion. *CVPR '04*, 1:120-127, 2004.
[16] M. Wilczkowiak, G. J. Brostow, B. Tordoff, and R. Cipolla. Hole filling through photomontage.
[17] L. Wolf, M. Guttmann, and D. Cohen-Or. Non-homogeneous content-driven video-retargeting. In *ICCV '07*, 2007.
[18] U.S. Pat. No. 7,529,429, Auto collage. Rother, C., Bordeaux, L., Hamadi, Y., and Blake, A.
[19] A. Hertzmann, C. Jacobs, N. Oliver, B. Curless, and D. Salesin. Image analogies. In *SIGGRAPH* 2001, pp. 327-340.
[20] W. Freeman, T. Jones, and E. Pasztor, Example-based super-resolution. IEEE Computer Graphics and Applications vol. 22, no. 2, pp. 56-65. 2002.
[21] D. Glasner, S. Bagon, and M. Irani. 2009. Super-resolution from a single image. In ICCV 2009.
[22] C. Bishop, Pattern Recognition and Machine Learning. Springer, 2006.

Geometric image rearrangement is becoming more popular as it is being enabled by recent computer vision technologies. While early manipulations included mostly crop and scale, modern tools enable smart photomontage [1], image resizing (a.k.a. "retargeting") [2, 11, 17, 12, 14], object rearrangement and removal [4, 12, 5], etc. Recent retargeting methods propose effective resizing by examining image content and removing "less important" regions. Seam carving [2, 11] performs retargeting by iterative removal of narrow curves from the image. As an iterative greedy algorithm no global optimization can be made, and something as simple as removing one of several similar objects is impossible. Since seam carving removes regions having low gradients, significant distortions occur when most image regions have many gradients.

A continuous image warping was proposed in [17, 14]. While those methods provide global considerations, continuous warping can introduce significant distortions. Also, good object removal is almost impossible using a continuous warping. Both methods use saliency maps (e.g. face detection), and saliency mistakes may cause distorted results.

An approach based on bidirectional similarity is presented in [12], which also names retargeting as "summarization". Every feature in the input should appear in the output, and every feature in the output should appear in the input. This method can also be used for image rearrangement. This method is computationally intensive, and while the bidirectional similarity may indeed be important for summarization, it may not be essential for retargeting or other editing related tasks.

In patch transform [4], the image is segmented into patches which are than rearranged using global optimization. The need for prior determination of the patch size is a major drawback of this method. Also, the patches reduce significantly the flexibility for rearrangement and composition. The inherent problems of using patches are also affecting the object removal in [8]. We found that our results, moving individual pixels, significantly improve the results in [4].

An approach of processing images by example is "Image-Analogies" [19]. Their synthesis framework involves two stages: (i) A design stage, whose input includes two sample images, where one image is a filtered version of the other. This stage learns the associated filter. (ii) An application stage, in which the learned filter is applied to a new target image in order to create an analogous filtered result. The second stage includes searching for patches in the unfiltered sample image that are similar to patches in the target image, and their corresponding patches in the filtered sample image are copied into the output image. Note that if the two sample images are identical, the filter is the identity transformation, and this algorithm performs a texture transfer of the sample image into the target image. Example based super-resolution was introduced by [20], who use a database of similar images to create a super-resolution version of a given image. Super-resolution based on self similarity was recently proposed by [21]. In this work similarity between patches within the same scale and across scales is used for computing the magnified image. Their results are comparable to those of [20], suggesting that the information in the original image may be more useful than information from other images with similar textures.

SUMMARY OF THE DISCLOSURE

The present general inventive concept provides a method and system for shift-map image editing.

The present general inventive concept also provides a shift-map image editing method using hierarchical optimization and shift-map image generation to generate seamless and natural looking images.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a computer-implemented method for creating one or more natural looking output images from one or more input images having a plurality of input pixels based on given user constraints, the method including assigning to a value of output pixels in the output images a shift such that the respective value of an output pixel is derived from the value of the input pixel whose location is related to the location of the output pixel by said shift, wherein at least one shift is non-zero; said shift being determined by an optimization process that is adapted to minimize a cost function that includes a data term on the shifts of single pixels and a smoothness term on the shifts of pixel pairs; and computing the output image by applying the optimized shift-map between the input and output pixels; wherein: said data term can include user constraints being of two possible types:
  (i) shift constraints, which can serve to limit the location in the output images of selected input pixels; and
  (ii) saliency constraints, which indicate a preference that selected pixels in the input images will appear or will not appear in the output image.

The method may include the data term so as to change the aspect ratio of the input images.

The method may include setting the data term so as to remove one or more objects from the input image or change a respective location of one or more objects in the input image.

The method may include including setting the data term so as to compose several input images into a single output image.

The method may be used for creating a sharpness preserving magnified image from an original image, wherein the input images include the original image and at least one image that is magnified from the original image; and the data term corresponds to a shift map which builds an approximation to the original image from a set of images including a blurred version of the original image and at least one reduced image.

The method may be use for creating an output video from an input video.

The foregoing and/or other aspects and utilities of the present general inventive concept may also be achieved by providing a system for creating a natural looking output image from one or more input images having a plurality of input pixels based on given user constraints, the system including a memory for storing first data representative of the input pixels in the input images, and second data representative of one or more user constraints; an optimization unit coupled to the memory and being adapted for minimizing a cost function that includes the second data for user constraints and a smoothness term that measures discontinuities in the output image from discontinuities in the shift map; a transformation unit coupled to the optimization unit and being configured to assign to a value of every output pixel in the output images a shift such that the value of each output pixel is derived from the value of the input pixel whose location is related to the location of the output pixel by said shift, wherein at least one shift is non-zero; said user constraints being of two possible types:
  (i) shift constraints, which serve to limit or force movement of selected pixels; and
  (ii) saliency constraints, which indicate a preference that selected pixels in the input images will appear in the output image by giving them a negative cost.

The system may further include a display unit coupled to the memory for displaying the input images, and a user-interface operatively coupled to the display unit for selecting one or more portions in the input images to which constraints are to be applied.

The foregoing and/or other aspects and utilities of the present general inventive concept may also be achieved by providing a computer-implemented program storage device readable by machine, tangibly embodying a program of instructions executable by the machine to perform a method for creating one or more natural looking output images from one or more input images having a plurality of input pixels based on given user constraints, the method including assigning to a value of output pixels in the output images a shift such that the respective value of an output pixel is derived from the value of the input pixel whose location is related to the location of the output pixel by said shift, wherein at least one shift is non-zero; said shift being determined by an optimization process that is adapted to minimize a cost function that includes a data term on the shifts of single pixels and a smoothness term on the shifts of pixel pairs; and computing the output image by applying the optimized shift-map between the input and output pixels; wherein: said data term can include user constraints being of two possible types:
  (i) shift constraints, which can serve to limit the location in the output images of selected input pixels; and
  (ii) saliency constraints, which indicate a preference that selected pixels in the input images will appear or will not appear in the output image.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Figure 1A:
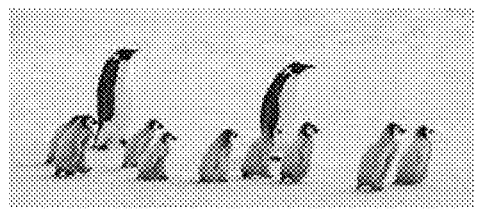
FIGS. 1a-1d illustrate the effect of shift-map retargeting an image for different output widths according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In shift-map a global optimization for a discrete labeling is performed over individual pixels, overcoming most of the difficulties of previous methods. Multi resolution optimization makes the shift-map computation very efficient. It will be appreciated that in practice, the optimization process may be aborted before the cost function is minimized. This may be dictated by the computing power and time factors as well and/or by the practical consideration that a visually pleasing output image may be obtained without necessarily running the optimization process to its ultimate conclusion. Thus, within the context of the description and claims it is to be noted that "optimal" and "optimized" are intended to mean that the results of an optimization process are used and not necessarily that the optimization process is run until full convergence.

It should also be noted that the term "natural looking" is intended to mean that the output image looks like an original unedited image. The output images produced by the method and system according to the general inventive concept do not look photo-edited. For example, movement of an object in the input image from a source location to a target location does not create a vacuum where the object was originally located, since the pixel data originally occupied by the object is filled in based on the surrounding pixel data in a manner that ensures smoothness and continuity. Likewise, the object at its target location does not appear merely to be photo-montaged but is blended into its new surrounding in a manner that ensures smoothness and continuity. It is principally in this regard that the results of the general inventive concept are superior to those of hitherto-proposed approaches.

Image/Video Editing as Graph Labeling

Let I be a set of images, where I(x, y, t) designates the (x, y) pixel in image t. It should be clear that this notation is applicable also when the set of images includes only a single image, in which case the third index is not used.

The relationship between an input image I(x, y, t) and an output image R(u, v, w) in image/video rearrangement and retargeting is defined by a shift-map M(u, v, w)=($t_x$, $t_y$, $t_{ind}$). The output pixel R(u, v, w) will be derived from the input pixel I(u+$t_x$, v+$t_y$, w+$t_{ind}$).

The optimal shift-map is defined as a graph labeling, where the nodes are the pixels of the output images, and each output pixel can be labeled by a shift ($t_x$, $t_y$, $t_{ind}$). The optimal shift-map M minimizes the following cost function:

$$E(M) = \alpha \sum_{p \in R} E_d(M(p)) + \sum_{(p,q) \in R} E_s(M(p), M(q)) \quad (1)$$

where $E_d$ is a unary data term providing external requirements, and $E_s$ is a smoothness term defined over neighboring pixels N. α is a user defined weight balancing the two terms, and in all our examples we used α=1, but the weight can vary depending on the type of application. Once the graph is given, the shift-map labeling is computed using graph cuts or the alpha expansion algorithm [3, 7]. Assignment of new locations to pixels using graph labeling has been used in several image-editing applications [18, 9]. Each term will now be defined in detail.

Single Pixel Data Term

The data term $E_d$ is used to enter external constraints. We will describe the cases of pixel rearrangement, pixel removal, and pixel saliency.

Another possible use of the data term $E_d$ is to maximize similarity between a target image/images P and the output image/images R=I(p+t). The dissimilarity is represented by sum of square differences, using both color differences and gradient differences. In this case the data term can be defined as:

$$E_{d,basic}(p,t) = \|I(p+t) - P(p)\|^2 + \beta_d \|\nabla I(p+t) - \nabla P(p)\|^2 \quad (2)$$

for a pixel location p=(u, v, w) and a candidate shift-value t=($t_x$, $t_y$, $t_{ind}$). The color distance can be either the $L_2$ norm on RGB values, LAB values, or a robust distance which does not increase after reaching a threshold value. The gradient distance is an $L_2$ norm on the vertical, horizontal and temporal (if exists) gradient components. $\beta_d$ is a weight to combine these two terms and it varies from application to application. For some applications—it is useful to compute the data term on blurred versions of the target and source images to allow high frequency texture differences.

Pixel Rearrangement

When an output pixel (u, v, w) should originate from location (x, y, t) in the input images, the appropriate shift gets zero energy while all other shifts get a very high energy. This is expressed in the following equation:

$$E_d(M(u, v, w)) = \begin{cases} 0 & \text{if } (u+t_x = x) \wedge (v+t_y = y) \wedge (w+t_{ind} = t) \\ 1 & \text{otherwise} \end{cases} \quad (3)$$

For example, in changing the width of the image, this constraint is used to determine that both the leftmost and rightmost columns of the output image will come from the leftmost and rightmost columns of the input image.

Pixel Saliency and Removal

Specific pixels in the input image can be forced to appear or to disappear in the output image/images. A saliency map S(x, y, t) will be very high for pixels to be removed, and very low for salient pixels that should not be removed. When a saliency map is used, the data term $E_d$ for an output pixel (u, v, w) with a shift-map ($t_x$, $t_y$, $t_{ind}$) can be $$E_d(M(u,v,w)) = S(u+t_x, v+t_y, w+t_{ind}) \quad (4)$$

It is also possible to use automatic saliency map computed from the image such as the ones proposed in [19, 16]. FIGS. 1b to 1e show the effect of shift-map retargeting for different output widths.

Smoothness Term for Pixel Pairs

The construction of the smoothness term $E_s$ is similar to the formulation in [1]. The smoothness term $E_s(M(p),M(q))$ represents discontinuities added to the output image by discontinuities in the shift-map. A shift-map discontinuity exists between two neighboring locations $(u_1, v_1, w_1)$ and $(u_2, v_2, w_2)$ in the output image R if their shift-maps are different: $M(u_1, v_1, w_1) \neq M(u_2, v_2, w_2)$. The smoothness term should reflect, for each of the two neighboring output pixels, how different the value of its output neighbor is from the value of its input neighbor, as well as the difference of the output-neighbor gradient from the input-neighbor gradient. The smoothness term $E_s(M)$ can take into account both color differences and gradient differences between corresponding spatial neighbors in the output image and in the input image to create good stitching. This treatment is similar to [1].

$$E_s(M) = \sum_{(u,v,w) \in R} \sum_i (R((u, v, w)) + e_i) - I(M(u, v, w) + e_i)^2 + \beta \sum_{(u,v,w) \in R} \sum_i (\nabla R((u, v, w)) + e_i) - \nabla I(M(u, v, w) + e_i)^2 \quad (5)$$

where $e_i$ are the four unit vectors representing the four spatial neighbors of a pixel, the color differences are Euclidean distances in RGB, $\nabla I$ and $\nabla R$ are the magnitude of the image gradients at these locations, and $\beta$ is a weight to combine these two terms. In most of our experiments we used $\beta=2$. We model the color and gradient differences using $\|x\|^2$ and not $\|x\|$. As we use non-metric distances, many of the theoretical guarantees of the alpha expansion algorithm are lost. However, in practice we have found that good results are obtained. We further found that squaring the differences gave better results than using the absolute value, preferring many small stitches over one large jump. Deviation from a metric distance was also made in [1, 9].

Hierarchical Solution

To further enforce global consistency and to speed up convergence of the optimization, the graph labeling is solved using a Gaussian pyramid built over the input image. A properly coarse shift-map is first built for the coarsest pyramid level. This operation is very efficient, as both the number of nodes is smaller and the number of possible labels is smaller. Once a coarse shift-map is assigned, it is interpolated as an initial guess for the labels in the higher resolution level of the pyramid. Using the initial guess from the coarser level, the range of labels which is examined can be very small. We used in some cases only three refinement labels (−1, 0, +1) in each direction, a total of nine labels. While the hierarchical approach may reach an approximate solution, the results are still very good.

A multi-resolution method for graph cut of two labels (min-cut) was used in [12, 13], and was shown to provide good results. We used three to five pyramid levels, such that the coarsest level contains images up to 100×100 pixels, and propagated the shift-map to higher pyramid resolutions as described before. It took between 5 to 30 seconds to find the shift-map on most images in this application, but significant speedup can be obtained by optimizing the energy optimization solver in various ways, for example using GPU (graphics processing unit) processing capabilities.

Shift-Map Applications

Shift-map is computed by an optimal graph labeling, where a node in the graph corresponds to a pixel in the output image. We now describe how to build the graph and use shift-maps for several image editing applications.

Image Retargeting

Image retargeting is the change of image size, which is typically done in only a single direction in order to change the image aspect ratio. We will assume that the change is in image width, but we could also address changing both image dimensions.

Label Order Constraint

In image resizing it is reasonable to assume that the shift-map will retain the spatial order of objects, and the left-right relationship will not be inverted. This implies a monotonic shift-map. In the case of horizontal image resizing, if $M(u, v, w)=(t_x, t_y, t_{ind})$ and $M(u+1, v)=(t'_x, t'_y, t_{ind})$, then $t'_x > t_x$. This restriction limits the number of possible labels to be the number of removed pixels: when reducing or increasing the width of the input image by 100 pixels, the label of each pixel can only be one of 101 labels. In addition, the smoothness term will give an infinite cost to cases when $t'_x < t_x$. Note that for horizontal image reduction the values of $t_x$ are non-negative, and for image expansion the values of $t_x$ are non-positive. The order constraint is important also in case a saliency map is used, as it can be used to avoid duplication of salient pixels.

Theoretically, only horizontal shifts need to be considered for horizontal resizing. However, this makes it impossible to respect geometrical image properties such as straight diagonal lines. When small vertical shifts are allowed, in addition to the horizontal shifts, the smoothness term will better preserve image structure.

Controlling Object Removal

Figure 1B:
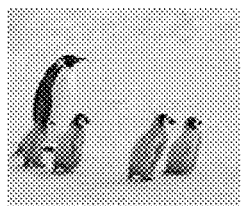
Figure 1C:
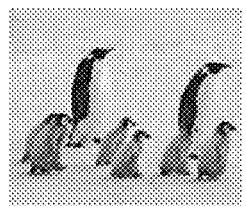
Figure 1D:
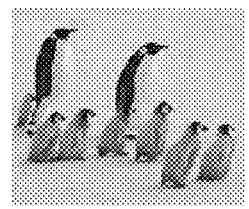

It is possible to control the size and number of removed objects by performing several steps of resizing, since the smoothness constraints will prevent the removal of an object larger than the step size. In FIG. 1 it is demonstrated than when more steps are performed fewer objects are removed from the image. FIGS. 1b to 1d show the effect of controlling object removal from an original image shown in FIG. 1a by changing the number of shift-cut steps. FIG. 1b shows that resizing in a single step may cut out some of the objects. FIG. 1c shows the effect of using six smaller resizing steps, which results in the removal of fewer objects. FIG. 1d shows the effect of using ten even smaller steps, which results in the removal of even fewer objects. Note that in order to fit more objects in a smaller image, the result in FIG. 1d has vertical shifts introduced automatically by the optimization process.

Image Rearrangement

Image rearrangement consists of moving an object or multiple objects to new image locations, or deleting parts of the image, while keeping some of the content of the image unchanged. The user selects a region to move, and specifies the location at which the selected region will be placed. A new image is generated satisfying this constraint. This application was demonstrated in [12, 4] and gave impressive results in many cases.

Object rearrangement is specified in two parts using the data term. One part forces pixels to appear in a new location using Eq. 3. The second part marks these pixels for removal from their original location using Eq. 4.

Figure 2A:
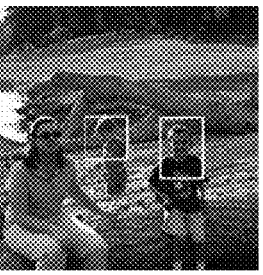
FIGS. 2a to 2c illustrate re-arrangement of objects in an image according to an embodiment of the present general inventive concept.
Figure 2B:
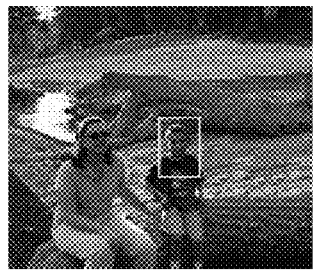
Figure 2C:
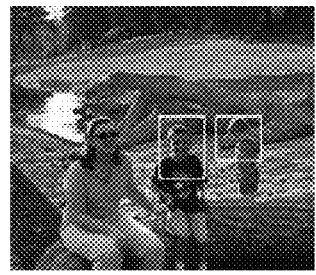
Figure 3A:
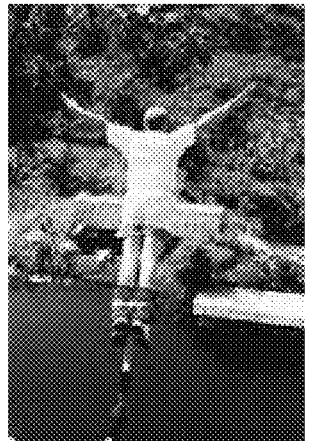
FIGS. 3a to 3e illustrate how an object is removed using shift-maps according to an embodiment of the present general inventive concept.
Figure 3B:
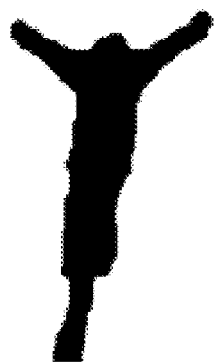
Figure 3C:
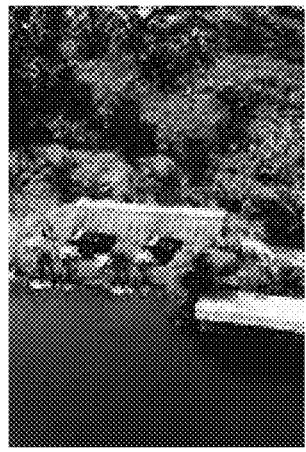
Figure 3D:
Figure 3E:

FIG. 2a shows an original image to be re-arranged so as to remove the small boy and reposition the big boy to the left. FIG. 2b shows shift-map results according to the general inventive concept with the marked user constraints ("move the big boy to the left") on top of the result. FIG. 2c shows an additional rearrangement on the same image where the small boy is re-positioned to the right.

In image rearrangement pixels can be relocated by a large displacement, creating a possible computational complexity. The need to allow many possible shifts as labels may cause an exponential explosion. In order to reduce this complexity, the set of allowed shifts for each pixel will include local shifts around its original location, plus local shifts around the displaced location.

As the number of labels grows significantly when there are multiple user constraints, a smart ordering is used for the alpha expansion algorithm of the graph cut [3] to enable fast convergence. The main idea of the alpha-expansion algorithm is to split the graph labels to α and non-α, and perform a min cut between those labels allowing non-α labels to change to α. The algorithm will iterate through each possible label for α until convergence. Starting the alpha expansion first on the labels that represent user constraints improved the speed and image quality, as in many cases user is marking only small part of the object and those first expansion steps are getting the rest of the object to its desired location. Alpha expansion on the remaining labels generates the final composition.

Object Removal

Shift-map can be used for object removal, which is extensively studied in computer vision [5, 6, 15]. After interactive marking of unwanted pixels, an automated process completes the missing area from other image regions or from other images. Using shift-maps, the unwanted pixels are given an infinitely high data term as described in Eq. 4. The shift-map maps pixels inside the hole to other locations in the input image or set of input images that can be used as source for filling the missing region. Once the mapping is completed by performing graph cut optimization, the missing pixels are copied from their source location. Most of the existing object removal algorithm such as [5] iteratively reduce the size of the hole, and therefore in each step can only make local considerations. The shift-map approach treats object removal as a global optimization and therefore the entire filled content is considered at once.

An example demonstrating object removal with shift-maps is shown in FIG. 3. FIG. 3a shows an original image of the "bungee jumper", taken from [5]. FIG. 3b shows a mask image where the black area needs to be removed from the image. FIG. 3c shows shift-map results according to the general inventive concept. FIGS. 3d and 3f show the respective final x and y components of the shift-map.

In addition to simple object removal shown in FIG. 11c, shift map can also be used for generalized object removal, where the labels of all pixels may be computed, and not only of the pixels in the hole area. This gives increased flexibility to reconstruct visually pleasing images when it is easier to synthesize other areas of the image. However, this approach may change the overall structure of the image as objects and areas have flexibility to move.

Image Composition

In the shift-map framework the input can consist of either a single image, or of a set of images. If there are multiple input images the shift-map $M(u, v, w)=(t_x, t_y, t_{ind})$ where $t_{ind}$ is the relative shift of the index of the input image used for each pixel. It is possible to produce an image rearrangement involving multiple images (selective composition) as was done in "Interactive Digital Photomontage" [1]. In [1] labels are specified only for the source image of each output pixel in the composite image, and therefore the input images has to be perfectly aligned. The shift-map approach is more general, as the label of each pixel consists of both shifting and source image selection. Shift-map can therefore tolerate misalignments between the input images. The resulting composite image can be a sophisticated combination of the input images, as various areas can move differently with respect to their location in the input.

Image-Synthesis Applications

Super-Resolution (Upscaling)

Consider the goal of upsizing an image J by a scaling factor of c into an output image R. The target image P is simply set to an upsized version of J created using a common resizing algorithm such as bilinear or bicubic interpolation, and denoted by resize(J, c). Using the self-similarity property [12, 21], the source image I should be the original image J itself. Super-resolution is found in [21] by searching the entire image for patches that are similar to each other within the same scale and across scales. We propose to exploit only local self-similarity within the image, i.e., to compose the neighborhood of an output pixel R(u, v) from segments in the input image whose locations are not very far from (u/c, v/c), and also exhibit similarity to the neighborhood of I(u/c, v/c). That way we rely more on multiscale repetitions or small regions rather than on larger regions. We therefore can constrain the magnitude of the shifts in the shift map to be smaller than a given value. A common value used in our experiments is that shift length is smaller than 20.

It may be possible to improve the resolution of the simple resizing, resize (J, 2), in some locations with patches taken from J itself. But on other locations it may be better to leave resize (J, 2) unchanged. Using both the original image J and the magnified image resize (J, 2) as two source images will not work, since resize (J, 2) is also the target image, and will automatically be used at lowest cost as the output image with no change.

To overcome this problem, we learn a shift-map $M_1$ using a preprocessing stage of similarity guided composition defined as follows. The original image J is used as a target image, and a blurred version and a downsized version of J are used as two source images. The learned shift map $M_1$ is used to constrain the shift-map $M_2$ used to build the super-resolution image of J from a simple resizing of J and from J itself.

More precisely, if $M_1 (u, v)=(r_x, r_y, r_{ind})$ is the learned shift map for generating J, the following values are imposed as constraints on $M_2$, the shift map that generated to super-resolution image:

$$M_2(2u,2v)=(2r_x,2r_y,r_{ind})$$

The source image $r_{ind}$ is unchanged, but the shifts are multiplied by 2 as the images are now larger. This method can be generalized to use as source images additional intermediate resolution scaling, e.g. resizing by √2. In our implementation we used a two such intermediate resizing steps.

As noted above, the method of [21] also involves a preprocessing stage of examining similar areas in down-scaled versions of the original image. A key difference between our method and the method of [21] is that instead of finding for each 5×5 patch its k nearest neighbors in the pyramid, we approximately find a global optimum for the problem of building the original image from pieces of the images in the pyramid. Another major difference between the two methods is that our output image is literally composed from non-overlapping pieces (in all color channels) of the second-step pyramid, while in [21] the information from the first step is only used as a prior for determining the super-resolution equations.

As the formulation is discrete, additional sub pixel shifts of the source image should be used. Alternatively, in order to achieve one level of sub-pixel accuracy, we use a target image of $P_2$=resize (J, 4) instead, and downsize the output image $R_2$ to get the final result.

Retargeting with Bi-Directional Similarity

The Composition Score

In similarity guided composition we create from a source image I, using shift-map, an output image that is most similar to a target image P. We denote this by an ordered pair of images ⟨P, I⟩, where we compute the optimal shift-map M which minimizes Eq. (1) and the data term is given by Eq. (2).

After performing similarity guided composition and assigning shift-map labels to all output pixels, local values of the data term (Eq. 2) and the smoothness term (Eq. 5) indicate how difficult it was to compose the target image P at each location from pieces of the source image I. This can indicate features in the target image that are missing from the source image.

For an ordered pair of images ⟨P, I⟩ we compute the optimal shift-map M as described above for the target image P and the source image I. Since the output R and the target P have the same size, the shift-map is defined on every pixel coordinate in P. The "composition-map" that indicates for every image location in p how hard was it to build its neighborhood from pieces of I is defined as follows:

$$E_{\langle P|I\rangle}(p) = \alpha E_d(p, M(p)) + E_{s,mean}(p, M) \quad (6)$$

$E_d$ was defined in Eq. 2 and it indicates how different are the pieces taken from the source image from the corresponding areas in the target image. $E_{s,mean}(p,M)$ should reflect the smoothness term in the neighborhood of a pixel p. We compute this map on a down-scaled version of the images using:

$$E_{s,mean}(p, M) = \frac{1}{4} \sum_{q \in N(p)} E_s(p, q, M(p), M(q)) \quad (7)$$

The global composition energy is defined as:

$$E(p \mid I) = \sum_{p \in P} E_{\langle P|I\rangle}(p) \quad (8)$$

and is equal to the value of E(M) in Eq. 1.

The Retargeting Algorithm

Image retargeting takes an input image A and generates an output image B having a different aspect ratio. Usually the transformation includes reducing either the length or the height of the image. Image summarization using bi-directional similarity was introduced in [12]. In this approach every patch in the output image B should have a similar patch in the input image A ("coherence") and vice versa: every patch in the input image A should have a similar patch in the output image B ("completeness"). We propose to model the dissimilarity in each direction using the global composition-energy: E(B|A) is inversely proportional to the coherence and E(A|B) is inversely proportional to the completeness. In other words, coherence is achieved if it is easy to build the output B out of pieces of the input A, and completeness is achieved if it is easy to build the input A out of pieces of the output B.

We use the shift-map retargeting which inherently imposes the coherence property, as all output regions come from the input image. But completeness is not guaranteed. To encourage completeness we use the saliency mechanism provided in shift-map. High saliency input regions will be include in the output image. We do this by computing the composition map $E_{\langle A|B \rangle}$.

Input regions with a high value of the composition map $E_{\langle A|B \rangle}$ indicate that these input regions can not be composed accurately from the output image B. If we increase the saliency of these input regions and re-compute the output B, we increase the likelihood that components from these regions will appear in the output, and thus increase the completeness. The iterative algorithm to create a retargeted image having bidirectional similarity is as follows.

In each iteration we use shift map to compute the retargeting result B from the input image A having a saliency map S. Initially the saliency map is zero. Since no saliency is initially used, it is possible that important parts of the input image will be missing in the initial retargeted image. Given the retargeted image B, the composition map $E_{\langle A|B \rangle}$ is computed using similarity guided composition. The saliency map of input regions that could not be composed, and therefore got a high value of the composition map, are increased. The value ΔS is added to the previous saliency S, where ΔS is computed as follows:

$$\Delta S(x, y) = \gamma \frac{E_{\langle A|B \rangle}(x, y)}{2^k}$$

We use γ=0.05, and the value of k is determined by searching k=0, 1, 2, ... until a value of k is found that reduces the composition global score E(A|B). These iterations continue, usually 2-3 iterations, until the improvement in the composition map is small. The algorithm is demonstrated using FIG. 3. In our implementation of shift-map retargeting we compute the data term as follows:

$$E_{d,ret}((u,v),(t_x,t_y)) = e^{-S_i(u+t_x, v+t_y)}$$

The proposed algorithm takes any initial guess of $B_0$ having the final dimensions of newSize, and converges to a reasonable result. This approach combines the benefits of shift-map retargeting with the quality of the bidirectional similarity [12].

Shift-maps are proposed as a new framework to describe various geometric rearrangement problems that can be computed as a global optimization. Images generated by the shift map are seamless and natural looking, as the method combines several desired properties:

Distortions that may be introduced by stitching are minimized due to the global smoothness term.
The geometric structure of the image is preserved.
Large regions can be synthesized.
Hierarchical optimization resulted in a very fast computation, especially in comparison to related editing approaches.

The applicability of shift map to retargeting, object removal, and image rearrangement was demonstrated and compared to state of the art algorithms.

Although shift-map editing performs well on a large variety of input, it may miss user's intensions. This can be controlled by using saliency maps, or by performing the algorithm in several steps.

Figure 4:
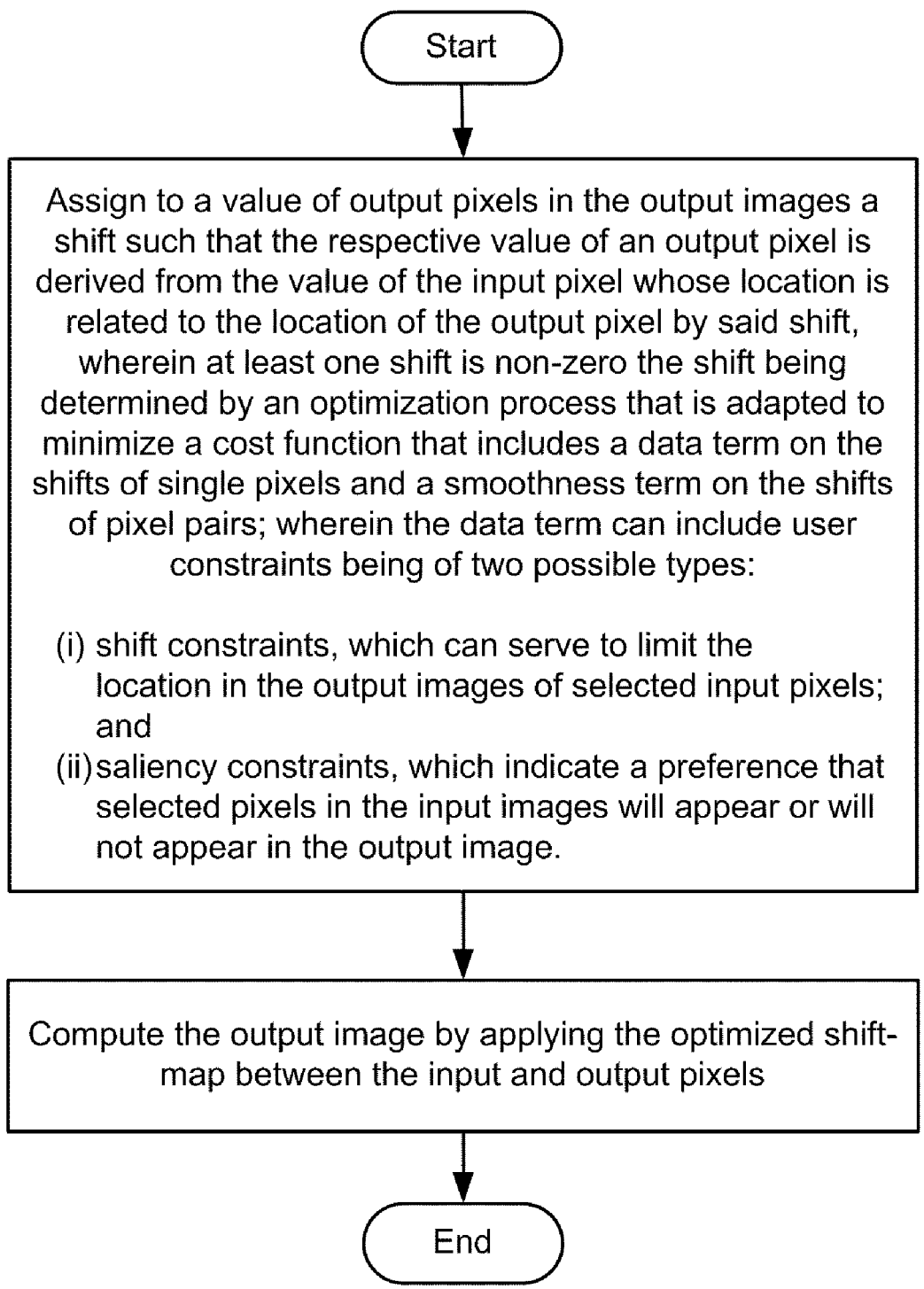
FIG. 4 is a flow diagram illustrating the operations of a shift-map editing method according to an embodiment of the present general inventive concept.

FIG. 4 is a flow diagram showing the principal operations carried out by a method according to the general inventive concept for creating one or more natural looking output images from one or more input images having a plurality of input pixels based on given user constraints. Pixels in the output images are assigned a shift such that the respective output pixel value is derived from the value of the input pixel whose location is related to that of the output pixel by the shift, at least one shift being non-zero. The shift is determined by an optimization process adapted to minimize a cost function that includes a data term on the shifts of single pixels and a smoothness term on the shifts of pixel pairs. The output image is computed by applying the optimized shift-map between the input and output pixels. The data term can include shift constraints that limit the location in the output images of selected input pixels, and saliency constraints, indicating a preference that selected pixels in the input images will or will not appear in the output image.

Figure 5:
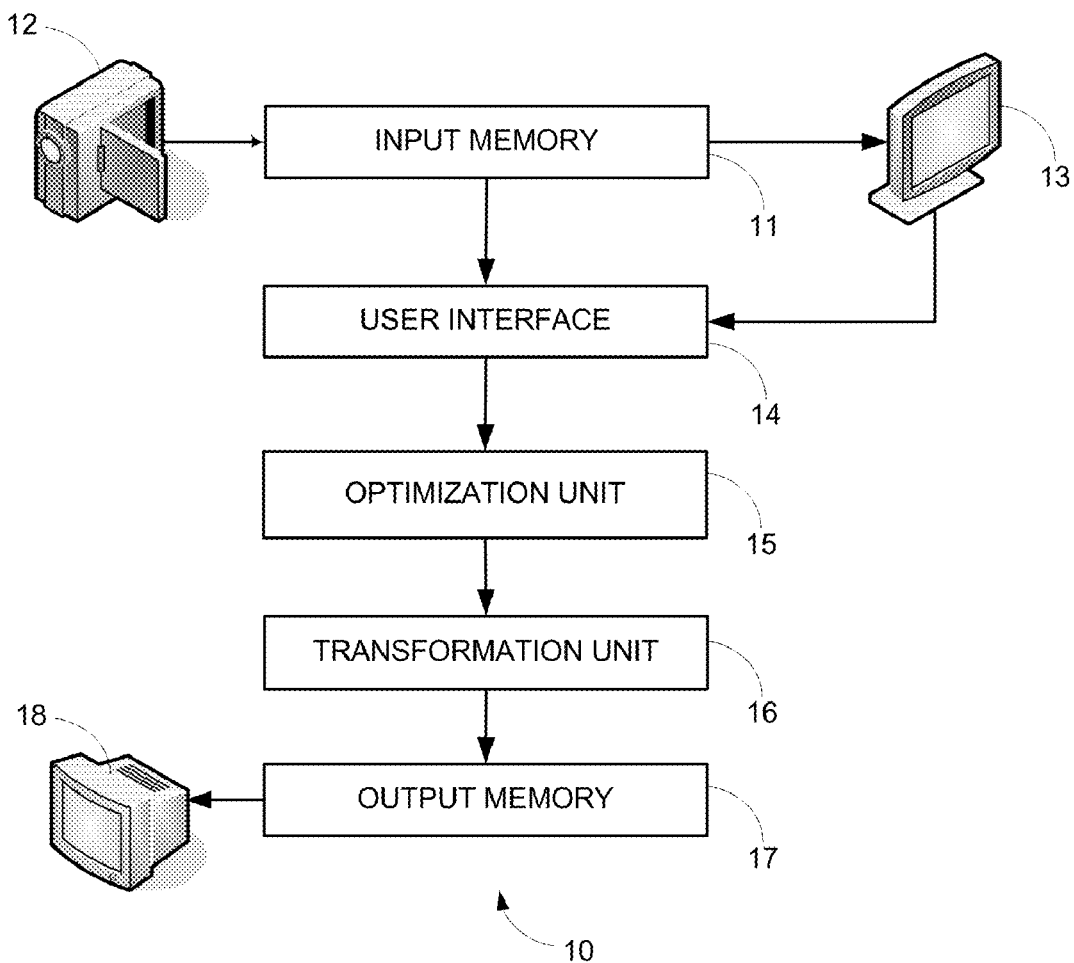
FIG. 5 is a block diagram illustrating a functionality of a system according to an embodiment of the present general inventive concept.

FIG. 5 is a block diagram showing functionality of a system 10 according to an embodiment the general inventive concept for creating a natural looking output image from one or more input images having a plurality of input pixels based on given user constraints. An input memory 11 stores first data representative of input pixels in the input images as obtained, for example, from a digital camera 12, and second data representative of one or more user constraints. In order to assign the user constraints, the input image may be displayed on a display device 13 to which there may be coupled a user interface 14 that allows a user to enter the user constraints using, for example, a graphical pointing device. Typically, the user constraints are entered and the output image is displayed in a single session in essentially real-time. However, the user constraints can also be entered in a pre-processing stage and stored in the memory 11, which can then be post-processed off-line so that the output image need not necessarily be processed or viewed in the same location as the input image.

An optimization unit 15 is coupled to the memory 11 and is adapted for minimizing a cost function that includes the second data for user constraints and a smoothness term that measures discontinuities in the output image from discontinuities in the shift map. A transformation unit 16 is coupled to the optimization unit 15 and is configured to assign to a value of every output pixel in the output images a shift such that the value of each output pixel is derived from the value of the input pixel whose location is related to the location of the output pixel by said shift, wherein at least one shift is non-zero. The resulting output image pixels are stored in an output memory 17 and may be displayed on a display module 18, which as noted above, may or may not be the same as the display device 13.

It will be appreciated that the input memory 11 may be integral with the system or may be external thereto. For example, the input memory 11 could be part of the digital camera 12, such as a memory card, that is then coupled to the system 10 for effecting shift-map editing prior to printing or displaying. However, in the case that the input memory 11 is part of the system, the input memory 11 and the output memory 17 may be realized by a common memory module. The general inventive concept also contemplates that either or both of the input memory 11 and the output memory 17 may be part of, or associated with, an external server for external access by the system 10.

It will be understood that the system according to the general inventive concept may be a suitably programmed computer. Likewise, the general inventive concept contemplates a computer program being readable by a computer for executing the method of the general inventive concept. The general inventive concept further contemplates a machine-readable memory tangibly embodying a program of instructions executable by the machine for executing the method of the general inventive concept.

It will also be understood that while in the described embodiments integer shifts were employed, fractional shifts are also possible. One possibility to use fractional shifts is to magnify the images and use integer shifts on the magnified images. This process can be simulated even without actually magnifying the images.

It will also be understood that while the described embodiments used graph-cuts to compute the optimal shift map, many additional optimization methods exist that can be used for this purpose. One such method can be, for example, belief propagation [22].

It will also be understood that while use of a specific similarity function between image pixels has been described, any other similarity measure may be used.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer-implemented method for creating one or more natural looking output images from one or more input images having a plurality of input pixels based on given user constraints, the method comprising:
   assigning to a value of output pixels in the output images a shift such that the respective value of an output pixel is derived from the value of the input pixel whose location is related to the location of the output pixel by said shift, wherein at least one shift is non-zero;
   said shift being determined by an optimization process that is adapted to minimize a cost function that includes a data term on the shifts of single pixels and a smoothness term on the shifts of pixel pairs; and
   computing the output image by applying the optimized shift-map between the input and output pixels; wherein:
   said data term can include user constraints being of two possible types:
   (i) shift constraints, which can serve to limit the location in the output images of selected input pixels; and
   (ii) saliency constraints, which indicate a preference that selected pixels in the input images will appear or will not appear in the output image.

2. The method according to claim 1, including setting the data term so as to change the aspect ratio of the input images.

3. The method according to claim 1, including setting the data term so as to remove one or more objects from the input image or change a respective location of one or more objects in the input image.

4. The method according to claim 1, including setting the data term so as to compose several input images into a single output image.

5. The method according to claim 1 for creating a sharpness preserving magnified image from an original image, wherein:
   the input images include the original image and at least one image that is magnified from the original image; and
   the data term corresponds to a shift map which builds an approximation to the original image from a set of images including a blurred version of the original image and at least one reduced image.

6. The method according to claim 1, for creating an output video from an input video.

7. A system for creating a natural looking output image from one or more input images having a plurality of input pixels based on given user constraints, the system comprising:
   a memory for storing first data representative of the input pixels in the input images, and second data representative of one or more user constraints;

an optimization unit coupled to the memory and being adapted for minimizing a cost function that includes the second data for user constraints and a smoothness term that measures discontinuities in the output image from discontinuities in the shift map;

a transformation unit coupled to the optimization unit and being configured to assign to a value of every output pixel in the output images a shift such that the value of each output pixel is derived from the value of the input pixel whose location is related to the location of the output pixel by said shift, wherein at least one shift is non-zero;

said user constraints being of two possible types:
(i) shift constraints, which serve to limit or force, movement of selected pixels; and
(ii) saliency constraints, which indicate, a preference that selected pixels in the input images will appear in the output image by giving them a negative cost.

8. The system according to claim 7, further including:
a display unit coupled to the memory for displaying the input images, and
a user-interface operatively coupled to the display unit for selecting one or more portions in the input images to which constraints are to be applied.

9. A non-transitory computer readable medium, tangibly embodying a program of instructions executable by the machine to perform a method for creating one or more natural looking output images from one or more input images having a plurality of input pixels based on given user constraints, the method comprising:

assigning to a value of output pixels in the output images a shift such that the respective value of an output pixel is derived from the value of the input pixel whose location is related to the location of the output pixel by said shift, wherein at least one shift is non-zero;

said shift being determined by an optimization process that is adapted to minimize a cost function that includes a data term on the shifts of single pixels and a smoothness term on the shifts of pixel pairs; and computing the output image by applying the optimized shift-map between the input and output pixels; wherein:

said data term can include user constraints being of two possible types:
(i) shift constraints, which can serve to limit the location in the output images of selected input pixels; and
(ii) saliency constraints, which indicate a preference that selected pixels in the input images will appear or will not appear in the output image.

\* \* \* \* \*